United States Patent
Casci et al.

(10) Patent No.: US 12,194,876 B2
(45) Date of Patent: Jan. 14, 2025

(54) CONTROLLER-BASED ACTIVE DISCHARGE CIRCUITRY FOR DISCHARGING LINK CAPACITOR OF TRACTION POWERTRAIN OF ELECTRIFIED VEHICLE

(71) Applicant: Ford Global Technologies, LLC, Dearborn, MI (US)

(72) Inventors: John P Casci, Canton, MI (US); Baoming Ge, Okemos, MI (US); Fan Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 18/310,279

(22) Filed: May 1, 2023

(65) Prior Publication Data

US 2024/0367537 A1  Nov. 7, 2024

(51) Int. Cl.
*B60L 50/60* (2019.01)
*B60L 50/40* (2019.01)
*B60L 53/60* (2019.01)
*H02P 27/08* (2006.01)

(52) U.S. Cl.
CPC .............. *B60L 53/60* (2019.02); *B60L 50/40* (2019.02); *B60L 50/60* (2019.02); *H02P 27/08* (2013.01)

(58) Field of Classification Search
CPC .................................. B60L 50/60; B60L 50/40
USPC ........................................................ 307/10.1
See application file for complete search history.

(56) References Cited

U.S. PATENT DOCUMENTS

| | | | |
|---|---|---|---|
| 10,252,618 B2 * | 4/2019 | Zhou | B60L 3/003 |
| 10,384,561 B2 | 8/2019 | Yang et al. | |
| 2017/0355267 A1 | 12/2017 | Zhou et al. | |
| 2018/0079315 A1 * | 3/2018 | Yang | H02M 7/5387 |
| 2024/0146094 A1 * | 5/2024 | Kiefer | H02M 1/322 |

FOREIGN PATENT DOCUMENTS

| | | |
|---|---|---|
| CN | 107508528 A | 12/2017 |
| CN | 111244927 A | 6/2020 |
| CN | 210970699 U | 7/2020 |
| JP | H11348686 A * | 12/1999 |

* cited by examiner

*Primary Examiner* — Daniel Kessie
*Assistant Examiner* — Dru M Parries
(74) *Attorney, Agent, or Firm* — David B. Kelley; Brooks Kushman P.C.

(57) ABSTRACT

A traction powertrain system of an electrified vehicle includes a power electronics module and a controller. The power electronics module, such as in the form of an inverter, is configured to drive a traction motor with power from a traction battery via a DC-link capacitor. The controller has an on-board power source, such as in the form of a super capacitor. The controller is configured to, in response to detecting an event in which the DC-link capacitor is to be discharged, use power from the on-board power source for controlling the power electronics module and control the power electronics module to operate in a manner causing the DC-link capacitor to be discharged.

15 Claims, 4 Drawing Sheets

CONTROLLER-BASED ACTIVE DISCHARGE CIRCUITRY FOR DISCHARGING LINK CAPACITOR OF TRACTION POWERTRAIN OF ELECTRIFIED VEHICLE

TECHNICAL FIELD

The present disclosure relates to controlling an inverter of a traction powertrain of an electrified vehicle to discharge a link capacitor of the traction powertrain.

BACKGROUND

An electrified vehicle includes a traction powertrain having a traction battery, an inverter, and a traction motor. The traction powertrain further includes a link capacitor disposed between the traction battery and the inverter to maintain a desired input voltage from the traction battery to the inverter. The inverter powers the traction motor with electrical power from the traction battery via the link capacitor for the traction motor to propel the electrified vehicle.

SUMMARY

A system having an inverter and a controller is provided. The inverter is configured to drive a motor with power from a battery via a link capacitor. The controller has an on-board power source (such as an on-board capacitor) and is configured to, in response to detecting an event in which the link capacitor is to be discharged, (i) use power from the on-board power source for controlling the inverter and (ii) control the inverter to operate in a manner causing the link capacitor to be discharged.

The controller may further include a comparator configured to detect for the event and to trigger the controller to control the inverter to operate in the manner causing the link capacitor to be discharged in response to detecting the event.

The controller may be further configured to use power from an off-board power source for controlling the inverter and the power received by the controller from the off-board power source is terminated during the event. In this case, the comparator is further configured to detect the event upon the power received by the controller from the off-board power source being less than a predetermined threshold power.

The controller may apply a discharge pulse to power switches of the inverter in order to control the inverter to operate in the manner causing the link capacitor to be discharged. The controller may control power switches of the inverter to supply power from the link capacitor to the motor in a manner that causes a torque of the motor to be zero in order to control the inverter to operate in the manner causing the link capacitor to be discharged.

The controller may further include a charger sub-circuit configured to charge the on-board power source with power from an off-board power source while the controller receives power from the off-board power source, and the power received by the controller from the off-board power source is terminated during the event.

The controller may be further configured to open a contactor in order to disconnect the battery from the link capacitor in response to detecting the event.

A method for a power electronics module (such as an inverter) configured to drive a traction motor with power from a traction battery via a DC-link capacitor is provided. The method includes detecting, by a controller having an on-board power source (such as a super capacitor), an event in which the DC-link capacitor is to be discharged. The method further includes, upon the event being detected, (i) activating the on-board power source to supply power to the controller for use by the controller in controlling the power electronics module and (ii) controlling, by the controller, the power electronics module to operate in a manner causing the DC-link capacitor to discharge.

An electrified vehicle having a powertrain and a controller is provided. The powertrain includes a traction battery, a DC-link capacitor, a power electronics module (such as an inverter), and a traction motor. The power electronics module is configured to drive the traction motor with power from the traction battery via the DC-link capacitor. The controller has an on-board power source (such as a super capacitor). The controller is configured to detect an event in which the DC-link capacitor is to be discharged and, in response to detecting the event, (i) activate the on-board power source to supply power to the controller for use by the controller in controlling the power electronics module and (ii) control the power electronics module to operate in a manner causing the DC-link capacitor to discharge.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
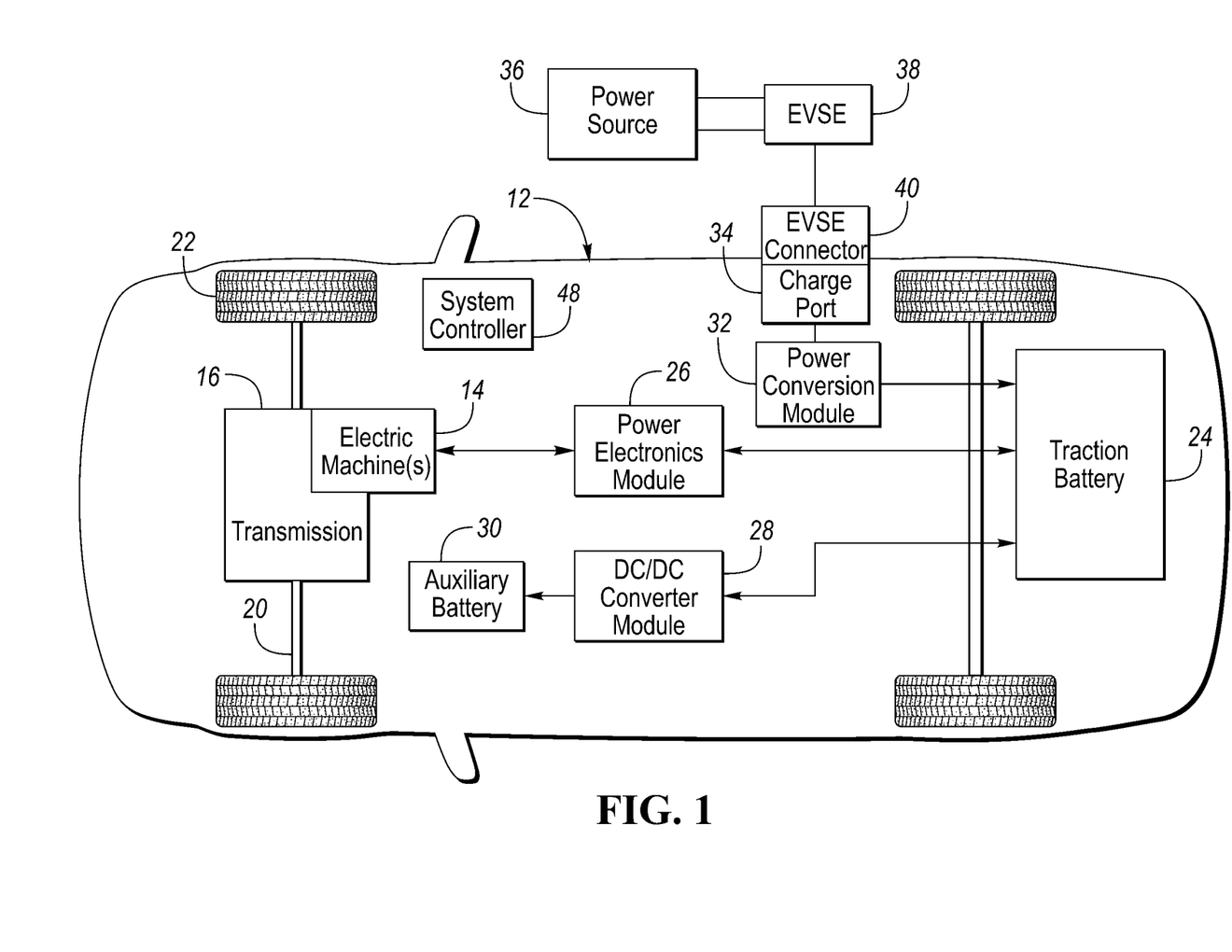
FIG. 1 illustrates a block diagram of a battery electric vehicle (BEV) having a traction powertrain including a traction battery, a power electronics module, and a traction motor.

Referring now to FIG. 1, a block diagram of an electrified vehicle 12 in the form of a battery electric vehicle (BEV) is shown. BEV 12 has a traction powertrain including one or more traction motors ("electric machine(s)") 14, a traction battery ("battery" or "battery pack") 24, and a power electronics module 26. In the BEV configuration, traction battery 24 provides all of the propulsion power and the electrified vehicle does not have an engine. In other variations, the electrified vehicle may be a plug-in (or non-plug-in) hybrid electric vehicle (HEV) further having an engine.

Traction motor 14 is part of the traction powertrain of BEV 12 for powering movement of the BEV. In this regard, traction motor 14 is mechanically connected to a transmission 16 of BEV 12. Transmission 16 is mechanically connected to a drive shaft 20 that is mechanically connected to wheels 22 of BEV 12. Traction motor 14 can provide propulsion capability to BEV 12 and is capable of operating as a generator. Traction motor 14 acting as a generator can recover energy that may normally be lost as heat in a friction braking system of BEV 12.

Traction battery 24 stores electrical energy that can be used by traction motor 14 for propelling BEV 12. Traction battery 24 typically provides a high-voltage (HV) direct current (DC) output.

Power electronics module 26 is electrically connected between traction battery 24 and traction motor 14. Power electronics module 26 is operable to drive traction motor 14 with electrical power from traction battery 24 for the traction motor to propel BEV 12. Power electronics module 26 provides the ability to bi-directionally transfer energy between traction battery 24 and traction motor 14. For example, traction battery 24 may provide a DC voltage while traction motor 14 may require a three-phase alternating current (AC) current to function. Power electronics module 26 may convert the DC voltage to a three-phase AC current to operate traction motor 14. In a regenerative mode, power electronics module 26 may convert three-phase AC current from traction motor 14 acting as a generator to DC voltage compatible with traction battery 24. In this example, power electronics module 26 is in the form of an inverter (or inverter system controller (ISC)).

In addition to providing electrical power for vehicle propulsion, traction battery 24 may provide electrical power for other vehicle electrical systems. A typical vehicle electrical system may include a DC/DC converter module 28 that converts the HV DC output of traction battery 24 to a low-voltage (LV) DC supply compatible with other low-voltage vehicle components. Other high-voltage loads, such as compressors and electric heaters, may be connected directly to the high-voltage supply without the use of DC/DC converter module 28. An auxiliary battery 30 (e.g., a twelve-volt DC battery) is charged by DC/DC converter module 28. The low-voltage vehicle components are electrically connected to auxiliary battery 30.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of BEV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. Controller 48 may be a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Figure 2:
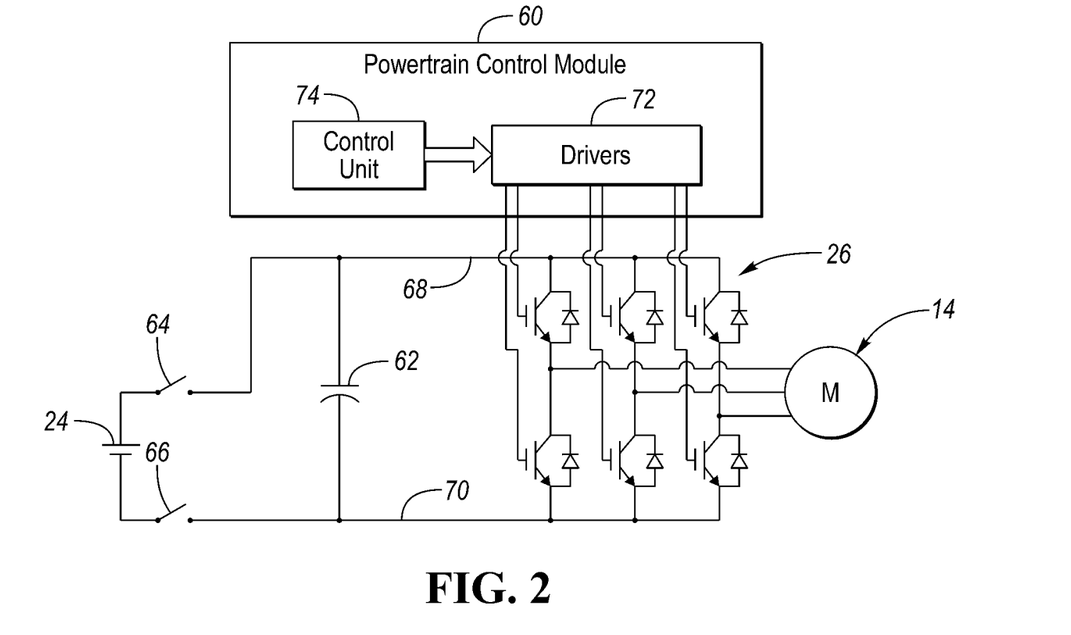
FIG. 2 illustrates a schematic diagram of the traction powertrain and a powertrain controller for the traction powertrain, the traction powertrain further including a link capacitor (i.e., a DC-link capacitor) disposed between the traction battery and the power electronics module, and the power electronics module being in the form of an inverter.

Referring now to FIG. 2, with continual reference to FIG. 1, a schematic diagram of the traction powertrain of BEV 12 and a powertrain control module 60 for the traction powertrain is shown. Powertrain control module 60 (or "powertrain controller") is considered as being implemented by controller 48.

As indicated, the traction powertrain includes traction motor 14, traction battery 24, and inverter 26. As shown in FIG. 2, the traction powertrain further includes a DC-link capacitor 62. DC-link capacitor 62 is disposed between traction battery 24 and inverter 26. Particularly, DC-link capacitor 62 is connected between a positive bus 68 and a negative bus 70 of the traction powertrain and is connectable in parallel with traction battery 24 through a pair of switches 64 and 66. Switches 64 and 66 have an opened state and a closed state for selectively coupling traction battery 24 to positive bus 68 and negative bus 70. DC-link capacitor 62 is a relatively large energy storage capacitor employed by inverter 26 to maintain a desired DC input voltage from traction battery 24 to the inverter and to absorb switching related ripples.

As shown in FIG. 2, inverter 26 includes a plurality of power switches (not labeled; circuit symbols shown) arranged in a bridge configuration. Particularly, in this example, there are six power switches with respective pairs of the power switches being respectively arranged in three phase legs. Powertrain controller 60 controls the power switches to switch on and off in a desired manner for inverter 26 to drive traction motor 14 with electrical power from traction battery 24 via DC-link capacitor 62. Each power switch may be an insulated-gate bipolar transistor (IGBT) (IGBT symbols shown in FIG. 2) or another type of semiconductor power switch (e.g., MOSFET). Each power switch has a control terminal (e.g., a gate) coupled to a respective driver circuit 72 of powertrain controller 60. Powertrain controller 60 further includes a control unit (e.g., a motor-generator control unit (MGCU)) 74. Driver circuits 72 are controlled by control unit 74 which generates switching commands according to various operating modes of inverter 26.

Figure 3:
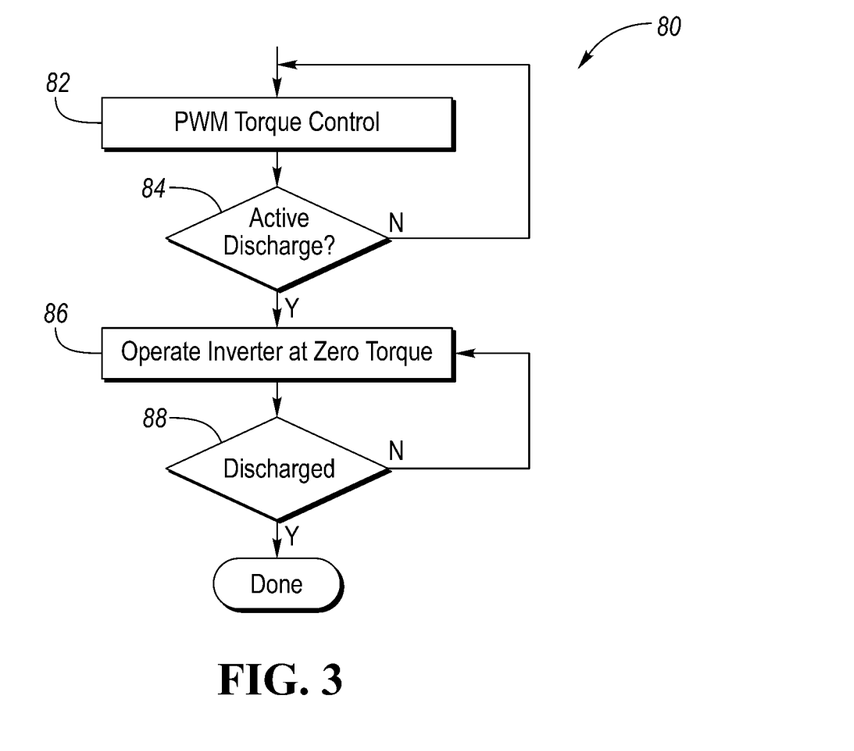
FIG. 3 illustrates a flowchart describing operation carried out by the powertrain controller for controlling the inverter, the operation including (i) a normal operation involving controlling the inverter to drive the traction motor with electrical power from the traction battery via the link capacitor in order for the traction motor to propel the electrified vehicle and (ii) an active discharge operation involving controlling the inverter in a manner causing the DC-link capacitor to discharge.

Referring now to FIG. 3, with continual reference to FIG. 2, a flowchart 80 describing operation carried out by powertrain controller 60 for controlling inverter 26 is shown. The operation includes a normal operation and an active discharge operation. In the normal operation, powertrain controller 60 controls inverter 26 to drive traction motor 14 with electrical power from traction battery 24 via DC-link capacitor 62 in order for the traction motor to propel BEV 12. In the active discharge operation, powertrain controller 60 controls inverter 26 in a manner causing DC-link capacitor 62 to discharge.

Pursuant to the normal operation, for example, powertrain controller 60 performs pulse-width modulation (PWM) control of the power switches of inverter 26, as indicated by process block 82. As such, PWM control signals having a controlled duty cycle are applied by control unit 74 to the gates of the power switches via respective driver circuits 72. In this way, inverter 26 is controlled to operate in a normal PWM torque control mode to drive traction motor 14 with electrical power from traction battery 24 via DC-link capacitor 62 in order for the traction motor to propel BEV 12.

A check is continually performed to determine whether an active discharge event of DC-link capacitor 62 is desired, as indicated by decision block 84. If no, then the normal operation continues per process block 82. If yes, then the normal operation ceases and the active discharge operation commences.

As the active discharge operation involves discharging DC-link capacitor 62, traction battery 24 is to be disconnected from the DC-link capacitor for the active discharge operation to occur. The active discharge operation may thus commence while switches 64 and 66 are opened with DC-link capacitor 62 thereby being disconnected from traction battery 24.

Pursuant to the active discharge operation, for example, powertrain controller 60 controls the power switches of inverter 26 to supply electrical current from DC-link capacitor 62 to the traction motor load in a manner that causes the torque of traction motor 14 to be zero, as indicated by process block 86. For example, powertrain controller 60 can pulse-width modulate the power switches of inverter 26 according to an algorithm that pushes a zero-torque current which results in zero motor torque while dissipating charge on DC-link capacitor 62. More generally, powertrain controller 60 applies an appropriate "discharge pulse" to the gates of the power switches of inverter 26 to cause the inverter to operate in a manner causing DC-link capacitor 62 to discharge. In this way, powertrain controller 60 controls inverter 26 to operate in a manner causing DC-link capacitor 62 to discharge.

A check is continually performed to determine whether DC-link capacitor 62 has been discharged, as indicated by decision block 88. If no, then the active discharge operation continues per process block 86. If yes, then the active discharge operation is terminated.

The active discharge operation is applicable for rapidly discharging DC-link capacitor 62 when shutting down the electric drive system of the traction powertrain. A shutdown of the electric drive system can be initiated by various events. During such a shutdown, traction battery 24 is quickly isolated from the rest of the electric drive system by opening switches 64 and 66. However, a HV electric charge will remain on DC-link capacitor 62. As such, DC-link capacitor 62 should be discharged to a certain level within a specific time.

During the normal operation, powertrain controller 60 receives electrical power from auxiliary battery 30 in order for the powertrain controller to perform the normal operation in controlling inverter 26. An issue is that during certain shutdown events, the flow of electrical power from auxiliary battery 30 to powertrain controller 60 is disrupted whereby the powertrain controller receives no electrical power from the auxiliary battery. As such, powertrain controller 60 is unable to perform the active discharge operation in controlling inverter 26 unless the powertrain controller is electrically powered by another source. Further, in order for DC-link capacitor 62 to be discharged to the certain level within the specific time, powertrain controller 60 should immediately proceed with the active discharge operation as soon as a shutdown event occurs.

In accordance with the present disclosure, powertrain controller 60 is configured (i) to be electrically powered by an electrical power source on-board the powertrain controller (i.e., an electrical power source other than auxiliary battery 30) during a shutdown event such that the powertrain controller can perform the active discharge operation in controlling inverter 26 and (ii) to immediately proceed with the active discharge operation as soon as the shutdown event occurs to thereby be in the best position to discharge DC-link capacitor 62 to the certain level within the specific time.

Regarding the feature (i), powertrain controller 60 includes a low-voltage (e.g., twelve-volt) super capacitor which electrically powers the powertrain controller as soon as the powertrain controller stops receiving a sufficient level of electrical power from auxiliary battery 30. Powertrain controller 60 will stop receiving a sufficient level of electrical power upon certain shutdown events occurring. As such, the super capacitor electrically powers powertrain controller 60 during the active discharge operation whereby the powertrain controller is operable to perform the active discharge operation during a shutdown event.

Regarding the feature (ii), powertrain controller 60 includes a comparator which is used to trigger the powertrain controller to perform the active discharge operation upon detecting a shutdown event. Particularly, the comparator continually compares the level of electrical power (if any) received by powertrain controller 60 from auxiliary battery 30 with a predetermined threshold level. The received electrical power being less than the threshold level is indicative of a shutdown event occurring. This is because the flow of electrical power from auxiliary battery 30 to powertrain controller 60 will be disrupted during a shutdown event. The disruption results in the received electrical power being less than the threshold level. Upon the received electrical power becoming less than the threshold level, the comparator triggers powertrain controller 60 to perform the active discharge operation. In this way, the comparator is used to detect for a shutdown event and, upon detecting a shutdown event, the comparator is used to trigger powertrain controller 60 to perform the active discharge operation. Consequently, powertrain controller 60 immediately proceeds with the active discharge operation as soon as a shutdown event occurs to thereby be in the best position to discharge DC-link capacitor 62 to the certain level within the specific time.

Figure 4:
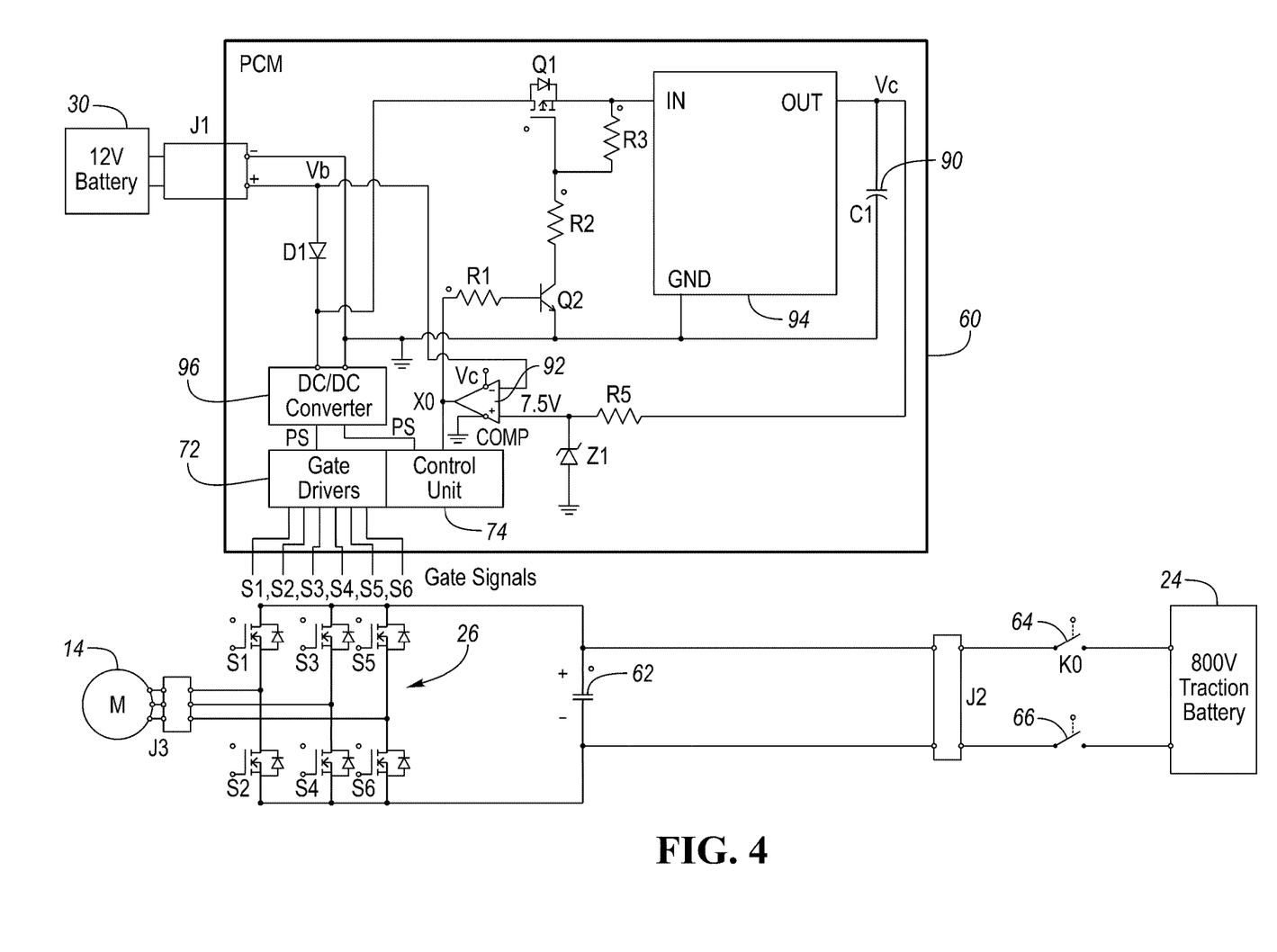
FIG. 4 illustrates a circuit diagram of the traction powertrain and the powertrain controller.

Referring now to FIG. 4, with continual reference to FIGS. 2 and 3, a circuit diagram of the traction powertrain and powertrain controller 60 is shown. Traction battery 24, DC-link capacitor 62, inverter 26, and traction motor 14 of the traction powertrain are shown. The power switches of inverter 26 are shown with MOSFET symbols. Gate drivers 72 and control unit 74 of powertrain controller 60 are also shown.

As further shown in FIG. 4, powertrain controller 60 is connected to auxiliary battery 30 to receive electrical power from the auxiliary battery in order to control inverter 26. Particularly, powertrain controller 60 further includes a DC/DC converter 96 which converts the electrical power from auxiliary battery 30 into a sufficient power level for use by control unit 74 and gate drivers 72 in controlling inverter 26.

As noted above, during the normal operation, the electrical power flow from auxiliary battery 30 to powertrain controller 60 is not disrupted and is at a sufficient level for the powertrain controller to be electrically powered in order to control inverter 26. However, as further noted above, during certain shutdown events in which the active discharge operation is desired, the electrical power flow from auxiliary battery 30 is disrupted and is not at a sufficient level for powertrain controller 60 to be electrically powered in order to perform the active discharge operation.

Accordingly, as further shown in FIG. 4, powertrain controller 60 further includes a super capacitor (C1) 90 and a charger sub-circuit 94. During the normal operation, charger sub-circuit 94 is configured to charge super capacitor 90 with electrical power from auxiliary battery 30. Charger sub-circuit 94 limits the charge current in charging super capacitor 90. For example, super capacitor 90 is charged to the charge level of auxiliary battery 30 (e.g., twelve volts). In turn, when the active discharge operation is required and powertrain controller 60 is not electrically powered by auxiliary battery 30, super capacitor 90 provides the electrical power for the powertrain controller to operate. Super capacitor 90 is relatively small but has a capacitance in several farads. That capacity can store the electrical energy for use by gate drivers 72, control unit 74, and DC/DC converter 96 during a discharge pulse duration for the active discharge operation.

As further shown in FIG. 4, powertrain controller 60 further includes a comparator (COMP) 92. As noted above, comparator 92 is used to (i) detect a shutdown event by virtue of being used to detect that the electrical power flow from auxiliary battery 30 to powertrain controller 60 is disrupted and is not at a sufficient level for the powertrain controller to be electrically powered in order to control inverter 26 and to (ii) trigger the powertrain controller (now being electrically powered by super capacitor 90 in order to control the inverter) to perform the active discharge operation upon detecting the shutdown event.

In further detail, as further shown in FIG. 4, powertrain controller 60 further includes, in the electrical configuration shown in FIG. 3, low-voltage active switches Q1 and Q2, resistors R1, R2, R3, and R5, a diode D1, a connection $V_b$ ahead of diode D1 (auxiliary battery side), a connection $X_0$ to control unit 74, and a Zener diode Z1. Powertrain controller 60 may be implemented with a printed circuit board (PCB). In such case, the noted electrical elements of powertrain controller 60 as well as drivers 72, control unit 74, super capacitor 90, comparator 92, charger sub-circuit 94, and DC/DC converter 96 are arranged on the PCB.

During the normal operation, the LV battery voltage $V_b$ (e.g., 12 V) is present and super capacitor 90 voltage $V_c$ is charged to the 12 V battery voltage. That means:

$V_b \geq 7.5$ V (7.5 V is a predetermined voltage level used by comparator 92)
$X_0 = 0$ (or low level)
Q1=OFF
Q2=OFF Consequently, powertrain controller 60 will continue the normal operation in controlling inverter 26 (i.e., the powertrain controller will not apply a discharge pulse to the power switches of inverter 26 pursuant to the active discharge operation).

However, during a shutdown event, the LV battery voltage $V_b$ will be 0 V, which is below the 7.5 V threshold. Then $X_0$ will be equal to 1 or high level to trigger control unit 74 to control gate drivers 72 to apply the discharge pulse to the power switches of inverter 26 pursuant to the active discharge operation. That means:

$V_b < 7.5$ V
$X_0 = 1$ (or high level)
Q1=ON
Q2=ON

Consequently, switches Q1 and Q2 turn ON whereby super capacitor 90 provides electrical power for gate drivers 72, control unit 74, and DC/DC converter 96 to operate, powertrain controller 60 will apply a discharge pulse to the power switches of inverter 26 pursuant to the active discharge operation. That is, the discharge pulse is applied over the motor inverter and windings.

The width of the discharge pulse is adjustable and is set by control unit 74. For example, the width of the discharge pulse can be 200 μ-sec, 400 μ-sec, etc. (i.e., as long as needed for DC-link capacitor 62 to be discharged). For the discharge pulse, a discharge pulse command control motor inverter operating at zero-torque condition (e.g., $I_q=0$ A and $I_d=100$ A) may be implemented. During discharge, powertrain controller 60 may implement a traction motor $I_d$-$I_q$ current closed control loop to control the discharge current. During discharge, the actual $I_d$-$I_q$ current will track the $I_d$-$I_q$ reference so traction motor BEMF (back electromotive force) cannot affect the discharge operation.

In further detail, one pulse of 200 or 400 μ-sec at 100 A are examples. In reality, the time duration of the discharge pulse and current amplitude can be adjusted by calibration according to specific vehicle condition such as capacitance and DC-bus voltage, etc. Further, before the discharge circuit starts to discharge the DC bus capacitor energy, a controller (e.g., a battery electronic control module (BECM)) usually has opened contactors 64 and 66, so traction battery 24 disconnects from DC-link capacitor 62. For example, when the actual battery voltage $V_b$ is lower than the minimum full function voltage of 7.5 V, then powertrain controller 60 will not be in the normal vehicle operation state and the BECM will open the contactors. For the proposed discharge strategy, it is capable of long time discharging, because inverter and motor windings can dissipate heat to keep their temperatures low. The proposed discharge strategy utilizes the traction motor's current closed-loop control to maintain discharge current, so the back EMF (BEMF) of the traction motor, even if more than a trivial amount, will not affect DC-link capacitor discharging.

In further detail, the arrangement of comparator 92 allows changes of the actual battery voltage $V_b$ in a relatively wide range and bypasses oscillating between ON and OFF. In this example, the minimum full function voltage for powertrain controller is 7.5 V. Accordingly, comparator 92 compares the actual battery voltage $V_b$ with the reference voltage 7.5 V (from $V_c$, Zener diode Z1, and resistor R5). If the actual battery voltage $V_b$ is greater than the reference voltage 7.5 V, then the actual battery voltage $V_b$ keeps providing electrical power and the normal operation of inverter 26 is not affected. If the actual battery voltage $V_b$ is smaller than the reference voltage 7.5 V, then the connection $X_0$ becomes high level and switch Q1 turns ON whereby super capacitor 90 provides electrical power for gate drivers 72, control unit 74, and DC/DC converter 96 to operate. The actual battery voltage $V_b$ keeps smaller than the reference voltage 7.5 V and the connection $X_0$ keeps high level to maintain switch Q1 at ON state while the voltage $V_c$ provides the electrical power for powertrain controller 60 to operate as the diode D1 blocks current flow into the auxiliary battery side.

Referring now to FIGS. 5A, 5B, 5C, and 5D, with continual reference to FIG. 4, circuit diagrams of respective charger sub-circuit versions 94a, 94b, 94c, and 94d are respectively shown. As shown, charger sub-circuit 94 can use discrete components (versions 94a and 94b) or integrated chip (IC) devices (versions 94c and 94d).

Figure 5A:
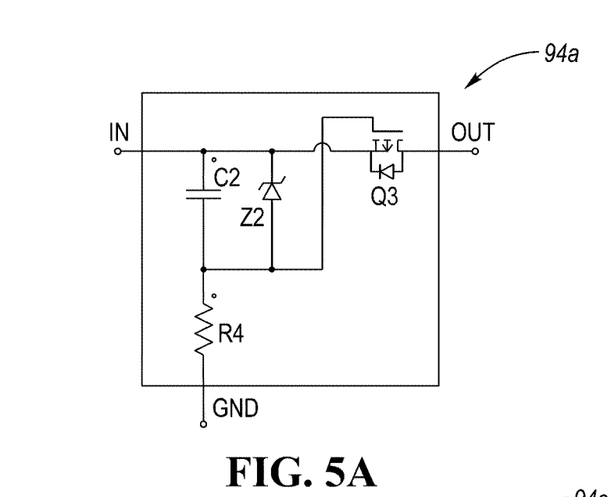
FIGS. 5A, 5B, 5C, and 5D illustrate circuit diagrams of respective versions of a charger sub-circuit of the powertrain controller, the charger sub-circuit being for charging a super capacitor of the powertrain controller with electrical power from an off-board auxiliary battery during the normal operation of the powertrain controller.

Charger sub-circuit version 94a shown in FIG. 5A limits inrush current by charging capacitor C2. As capacitor C2 charges, the voltage $V_{gs}$ of switch Q3 increases and allows switch Q3 to turn on slowly. The capacitance of capacitor C2 and the voltage $V_{gs}$ characteristic of switch Q3 determine how switch Q3 quickly turns on. Zener diode Z2 prevents switch Q3 from exceeding its maximum rating.

Figure 5B:
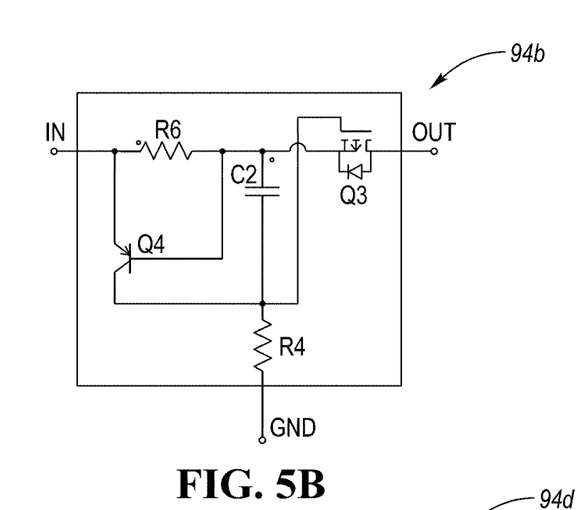

Charger sub-circuit version 94b shown in FIG. 5B uses PNP switch Q4 and resistor R6 to achieve current sensing and limiting. When current flows through resistor R6 and switch Q3, the voltage across resistor R6 creates the $V_{be}$ bias for switch Q4. If the current is too high, then switch Q4 turns on and limits conduction of switch Q3 by reducing $V_{gs}$ of switch Q3.

Figure 5C:
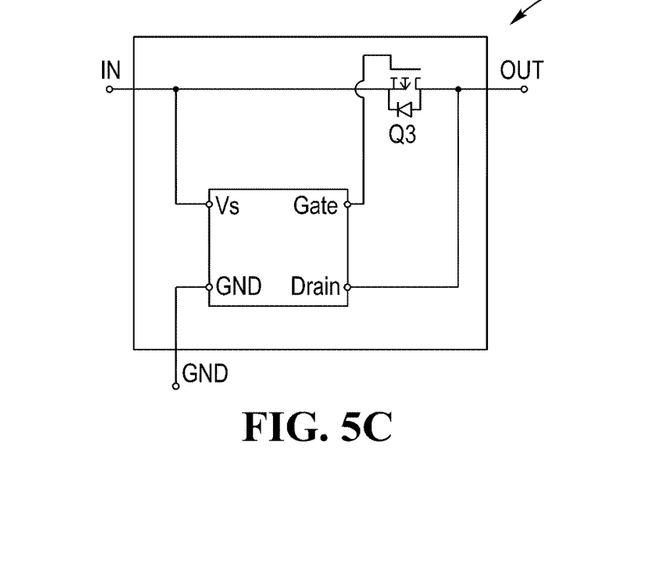
Figure 5D:
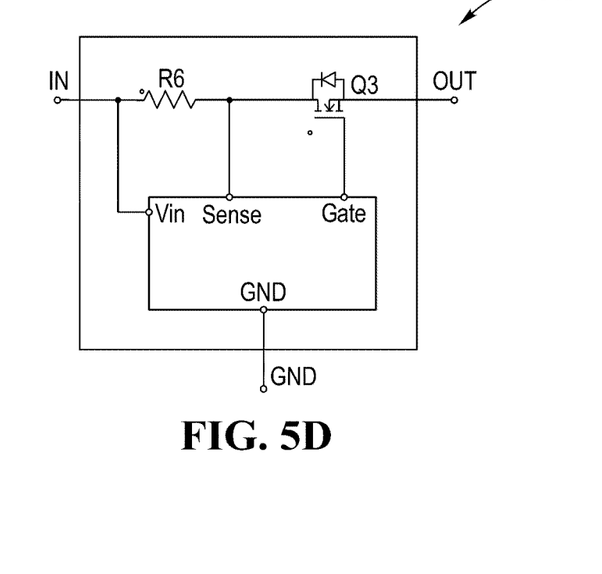

Charger sub-circuit versions 94c and 94d shown in FIGS. 5C and 5D uses few external components by using IC devices. Charger sub-circuit version 94c does not use a current sensing resistor to limit inrush current. Charger sub-circuit versions 94d uses a current sensing resistor R6 to limit current.

As described, powertrain controller 60 implements an active discharge circuitry for discharging a DC-link capacitor of a traction powertrain of an electrified vehicle. In this regard, powertrain controller 60 can cause inverter 26 to be operated in a manner in which DC-link capacitor 62 is discharged to a certain level within a specific time upon commencement of certain shutdown events. Powertrain controller 60 may meet the certain level and specific time requirements by discharging a main capacitor through the inverter and motor windings within any additional HV level components. Super capacitor 90 is used to energize the powertrain controller 60 during a shutdown event. This makes powertrain controller 60 relatively reliable. Further, powertrain controller 60 does not use a thermal management strategy such as for preventing overheating of a discharge resistor as no discharge register is utilized. Powertrain controller 60 just uses LV components which are relatively simple to package.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A system comprising:
   an inverter to drive a motor with power from a battery via a link capacitor; and
   a controller having an on-board power source and being configured to, in response to detecting an event in which the link capacitor is to be discharged, (i) use power from the on-board power source for controlling the inverter and (ii) control the inverter to operate in a manner causing the link capacitor to be discharged;
   the controller further includes a comparator configured to detect for the event and to trigger the controller to control the inverter to operate in the manner causing the link capacitor to be discharged in response to detecting the event;
   the controller is further configured to use power from an off-board power source for controlling the inverter and the power received by the controller from the off-board power source is terminated during the event; and
   the comparator is further configured to detect the event upon the power received by the controller from the off-board power source being less than a predetermined threshold power.

2. The system of claim 1 wherein:
   the controller applies a discharge pulse to power switches of the inverter to control the inverter to operate in the manner causing the link capacitor to be discharged.

3. The system of claim 1 wherein:
   the controller controls power switches of the inverter to supply power from the link capacitor to the motor in a manner that causes a torque of the motor to be zero to control the inverter to operate in the manner causing the link capacitor to be discharged.

4. The system of claim 1 wherein:
   the on-board power source is a super capacitor.

5. The system of claim 4 wherein:
   the super capacitor is configured to be activated, in response to the event, to enable the controller to use power from the super capacitor for controlling the inverter to operate in the manner causing the link capacitor to be discharged.

6. The system of claim 1 wherein:
   the controller is further configured to open a contactor to disconnect the battery from the link capacitor in response to detecting the event.

7. A method for a power electronics module configured to drive a traction motor with power from a traction battery via a DC-link capacitor, the method comprising:
   detecting, by a controller having an on-board power source, an event in which the DC-link capacitor is to be discharged;
   upon the event being detected, (i) activating the on-board power source to supply power to the controller for use by the controller in controlling the power electronics module and (ii) controlling, by the controller, the power electronics module to operate in a manner causing the DC-link capacitor to discharge; and
   charging, by a charger sub-circuit of the controller, the on-board power source with power from an off-board power source while the controller receives power from the off-board power source, wherein the power received by the controller from the off-board power source is terminated during the event.

8. The method of claim 7 further comprising:
   using a comparator of the controller to detect for the event; and
   triggering, by the comparator, in response to detecting the event, the controller to control the power electronics module to operate in the manner causing the link capacitor to be discharged.

9. The method of claim 7 further comprising:
   applying, by the controller, a discharge pulse to power switches of the power electronics module to control the power electronics module to operate in the manner causing the link capacitor to be discharged.

10. The method of claim 7 further comprising:
    activating the on-board power source, in response to the event, to enable the controller to use power from the on-board power source for controlling the power electronics module to operate in the manner causing the link capacitor to be discharged.

11. An electrified vehicle comprising:
a powertrain including a traction battery, a DC-link capacitor, a power electronics module, and a traction motor, the power electronics module being configured to drive the traction motor with power from the traction battery via the DC-link capacitor; and
a controller having an on-board power source, the controller being configured to detect an event in which the DC-link capacitor is to be discharged and, in response to detecting the event, (i) activate the on-board power source to supply power to the controller for use by the controller in controlling the power electronics module and (ii) control the power electronics module to operate in a manner causing the DC-link capacitor to discharge; and
the controller further includes a charger sub-circuit configured to charge the on-board power source with power from an off-board power source while the controller receives power from the off-board power source.

12. The electrified vehicle of claim 11 wherein:
the controller is further configured to use power from an off-board power source to control the power electronics module to drive the traction motor with power from the traction battery via the DC-link capacitor for the traction motor to propel the electrified vehicle, and the power received by the controller from the off-board power source is terminated during the event.

13. The electrified vehicle of claim 12 wherein:
the controller further includes a comparator configured to detect the event upon the power received by the controller from the off-board power source being less than a predetermined threshold power.

14. The electrified vehicle of claim 13 wherein:
the comparator is further configured to trigger the controller to control the power electronics module to operate in the manner causing the link capacitor to be discharged.

15. The electrified vehicle of claim 11 wherein:
the power electronics module is an inverter.

* * * * *